United States Patent
Bromley et al.

(10) Patent No.: US 8,353,049 B2
(45) Date of Patent: Jan. 8, 2013

(54) SEPARATING KEYS AND POLICY FOR CONSUMING CONTENT

(75) Inventors: Dennis N. Bromley, Issaquah, WA (US); Quintin S. Burns, Fort Mills, SC (US)

(73) Assignee: Microsoft Corporation, Redmond, WA (US)

( * ) Notice: Subject to any disclaimer, the term of this patent is extended or adjusted under 35 U.S.C. 154(b) by 934 days.

(21) Appl. No.: 12/105,260

(22) Filed: Apr. 17, 2008

(65) Prior Publication Data

US 2009/0265561 A1 Oct. 22, 2009

(51) Int. Cl.
*H04L 29/06* (2006.01)

(52) U.S. Cl. .......... 726/27; 713/158; 713/189; 713/193; 726/7; 726/31; 726/32; 726/33

(58) Field of Classification Search .......... 726/7, 31–33; 713/158
See application file for complete search history.

(56) References Cited

U.S. PATENT DOCUMENTS

| | | | |
|---|---|---|---|
| 2002/0114466 A1* | 8/2002 | Tanaka et al. ............... | 380/232 |
| 2002/0157002 A1* | 10/2002 | Messerges et al. .......... | 713/155 |
| 2004/0039594 A1 | 2/2004 | Narasimhan et al. | |
| 2004/0078293 A1* | 4/2004 | Iverson et al. .............. | 705/27 |
| 2004/0139312 A1 | 7/2004 | Medvinsky | |
| 2004/0249768 A1* | 12/2004 | Kontio et al. ............... | 705/65 |
| 2005/0049886 A1* | 3/2005 | Grannan et al. ............. | 705/1 |
| 2005/0091216 A1* | 4/2005 | Kranz et al. ................. | 707/10 |
| 2006/0190408 A1 | 8/2006 | Cook et al. | |
| 2007/0014413 A1 | 1/2007 | Oliveira et al. | |
| 2007/0016532 A1 | 1/2007 | Zhang et al. | |
| 2007/0178938 A1 | 8/2007 | Kravitz et al. | |
| 2007/0192810 A1 | 8/2007 | Pritchett et al. | |
| 2007/0192864 A1* | 8/2007 | Bryant et al. ............... | 726/23 |
| 2007/0204078 A1 | 8/2007 | Boccon-Gibod et al. | |
| 2008/0172718 A1* | 7/2008 | Bradley ...................... | 726/1 |
| 2011/0035577 A1* | 2/2011 | Lin et al. ..................... | 713/150 |

OTHER PUBLICATIONS

Microsoft Developers Network (MSDN), How license chaining works, copyright 2007, retrieved from http://msdn.microsoft.com/en-us/library/bb614606(v=vs.85).aspx on Mar. 31, 2011.*
Garcia, et al., "Formalising ODRL Semantics using Web Ontologies", retrieved at <<http://odrl.net/workshop2005/program/odrl-workshop2005.pdf#page=33>>, pp. 1-10.
Liu, "Protecting Privacy of Personal Content on an OMA DRM Platform", Jun. 2005, pp. 68.
Arnab, et al., "Fairer Usage Contracts for DRM", Proceedings of the 5th ACM workshop on Digital Rights Management, Nov. 7, 2005, ACM, pp. 1-7.
"Microsoft Windows 2000 Terminal Services Licensing", Microsoft Corporation, 2008, pp. 6.

* cited by examiner

*Primary Examiner* — Carl Colin
*Assistant Examiner* — Gary Lavelle
(74) *Attorney, Agent, or Firm* — Wolfe-SBMC

(57) ABSTRACT

In accordance with one or more aspects of the separating keys and policy for consuming content, content has a corresponding leaf license, and the leaf license has one or more associated root policy addenda. Each root policy addenda includes policy identifying when it is permissible to decrypt and consume the content, but excludes a content key to decrypt the content. The content can be decrypted and consumed only if the policy identifies that it is permissible to decrypt and consume the content.

16 Claims, 6 Drawing Sheets

SEPARATING KEYS AND POLICY FOR CONSUMING CONTENT

BACKGROUND

Various digital content, such as audio and/or video content, text content, computer programs, and so forth is available to computers and other digital devices. In order to protect their content and ensure only those who have acquired rights to use the content can indeed use the content, content is frequently encrypted using a cryptographic key. However, many current techniques employing cryptographic keys suffer from attacks where if the cryptographic key can be broken, then a large amount of content is no longer protected. This can be problematic for content owners and distributors as a single successful attack can leave a large amount of content unprotected.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the separating keys and policy for consuming content, a request is received to perform an action at the device with content, and one or more root policy addenda associated with a leaf license corresponding to the content are identified. If the one or more root policy addenda permit the action, then a key associated with the device is used to decrypt a content key in the leaf license, the leaf license being separate from the one or more root policy addenda. The content key is used to decrypt the content, and the action is performed with the content. However, if the one or more root policy addenda do not permit the action, then the action is not performed.

In accordance with one or more aspects of the separating keys and policy for consuming content, a root policy addenda corresponding to content on the device is received. The root policy addenda includes policy identifying when it is permissible to decrypt and consume the content but excludes a content key to decrypt the content. The root policy addenda is associated with a leaf license for the content, the leaf license including the content key to decrypt the content. The root policy addenda is stored in a root policy addenda store.

In accordance with one or more aspects of the separating keys and policy for consuming content, a device includes a first store to store content for use on the device, and a second store to store a leaf license for content in the first store and one or more root policy addenda bound to the leaf license. Each root policy addenda includes policy identifying when it is permissible to decrypt and consume the content but excludes a content key to decrypt the content. The device also includes a consumption module, coupled to the first store and the second store, to consume the content only if the policy identifies that it is permissible to decrypt and consume the content.

BRIEF DESCRIPTION OF THE DRAWINGS

The same numbers are used throughout the drawings to reference like features.

DETAILED DESCRIPTION

Separating keys and policy for consuming content are discussed herein. Content is encrypted using a content key in a leaf license corresponding to the content, and the content key in turn is encrypted with a key associated with the device on which the content is being used. One or more root policy addenda are bound to the leaf license. Each root policy addenda is separate from the leaf license and content key, and each root policy addenda includes policy describing when it is permissible to decrypt and consume the content.

Figure 1:
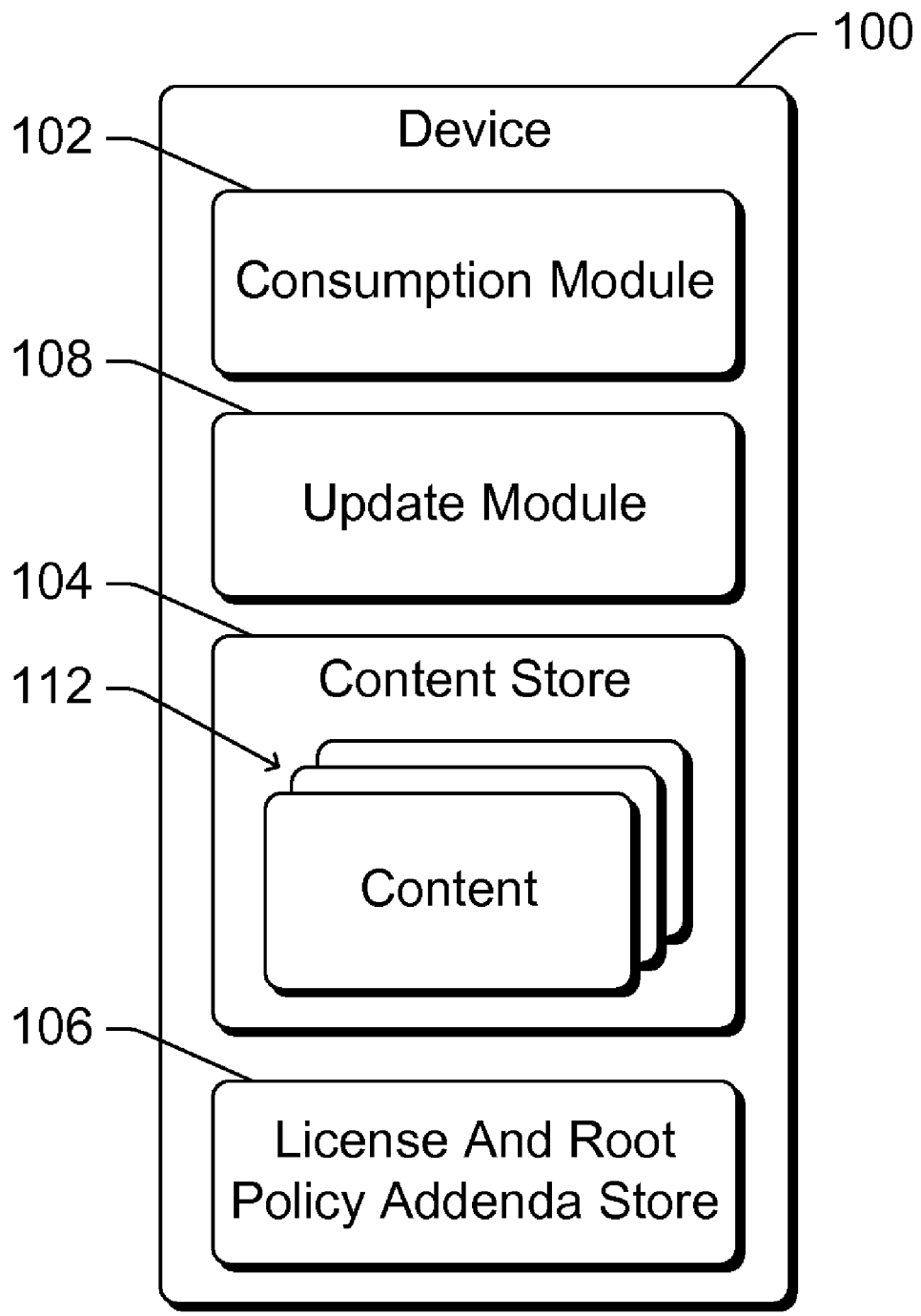
FIG. 1 illustrates an example device implementing the separating keys and policy for consuming content in accordance with one or more embodiments.

FIG. 1 illustrates an example device 100 implementing the separating keys and policy for consuming content in accordance with one or more embodiments. Device 100 can be a variety of different devices capable of playing, storing, or otherwise using content. For example, device 100 can be a desktop computer, a server computer, a mobile station, an entertainment appliance, a set-top box communicatively coupled to a display device, a wireless phone, a game console, an automotive computer, a kiosk, and so forth. Thus, device 100 may range from a full resource device with substantial memory and processor resources (e.g., personal computers, game consoles) to a low-resource device with limited memory and/or processing resources (e.g., traditional set-top boxes, hand-held game consoles).

Device 100 can play, store, transfer, and/or otherwise access or use digital content. Digital content, or simply content, as used herein refers to a variety of different digital or electronic content, such as audio content (e.g., songs), audio/video content (e.g., television shows, movies, documentaries, cartoons, etc.), image content (e.g., digital pictures), text content (e.g., electronic books), compiled or uncompiled computer programs or portions thereof, Java games, zipped or otherwise compressed files, email messages and attachments, and so forth, as well as combinations thereof. Whether and how particular content can be accessed by device 100 is determined based at least in part on a leaf license corresponding to that particular content and one or more root policy addenda associated with that leaf license, as discussed in more detail below.

Device 100 includes a consumption module 102, a content store 104, a license and root policy addenda store 106, and an update module 108. Content store 104 includes content 112, which can be multiple different digital content as discussed above (e.g., multiple songs, multiple movies, multiple programs, and so forth). Consumption module 102 manages the consumption of content 112 at device 100. How particular content 112 is consumed can vary based on a particular request received from a user to use content 112 as well as the type of content 112. For example, this consumption can include playback of content 112, transferring content 112 to another device, burning content 112 to a CD (compact disc) or other optical disc, printing a hard copy of content 112, emailing content 112, as well as other uses.

License and root policy addenda store 106 stores leaf licenses and root policy addenda for content 112. Although illustrated as a single store, leaf license and root policy addenda can alternatively be stored in separate stores. A license store of device 100 refers to a license store that is accessible to device 100. Such a license store can be one or more of store 106, one or more additional license stores located on another device (e.g., another device 100, a server computer or network storage device, a removable memory device, and so forth), a portion of content 112 in which embedded licenses can be stored, and so forth. Update module 108 manages updating of leaf licenses and root policy addenda on device 100, as discussed in more detail below.

Content 112 can be obtained by device 100 from one or more other devices (not shown) in a variety of different manners. In one or more embodiments, content is transferred to device 100 via a network, such as the Internet, a local area network (LAN), a public telephone network, an intranet, other public and/or proprietary networks, combinations thereof, and so forth. In other embodiments, content is transferred to device 100 from another device or storage component via a direct wired or wireless connection, such as a Universal Serial Bus (USB) connection, an IEEE 1394 compliant connection, a wireless USB connection, a Bluetooth connection, and so forth.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by comparing a verification value obtained using the public key with the original data, and if the two are the same then be assured that no one has tampered with or altered the data that was digitally signed.

In symmetric key cryptography, on the other hand, a shared key is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key.

Reference is also made herein to digital certificates. Digital certificates are well-known to those skilled in the art. Nonetheless, a brief overview of digital certificates is included here to assist the reader. A digital certificate can be generated by a trust authority that attests to the trustworthiness of a particular entity. The digital certificate is digitally signed by a trust authority using a private key of the trust authority. If entity A desires to verify the trustworthiness of entity B, then entity A can obtain the public key of the trust authority (which in some embodiments can be entity A) and verify the digital signature of the digital certificate. As the trust authority is trusted by entity A, entity B can be verified as being trusted if the digital signature of the digital certificate is verified as being correct.

Consumption module 102 enforces digital rights management (DRM) on device 100. Digital rights management refers to the protection of the rights of the artists, publishers, and/or copyright owners of digital content. The DRM techniques employed by consumption module 102 restrict the consumption of content 112 on device 100. A variety of different accesses or consumption of content 112 can be restricted, such as playback of content 112, burning content 112 to a CD or other optical disc, copying content 112 to another device, printing a hard copy of content 112, sending content 112 via email, and so forth.

The DRM techniques are employed by consumption module 102 to protect content 112 from improper uses or actions on device 100. The constraints on the use of content 112 are made known to device 100, typically as part of a leaf license and/or root policy addenda as discussed in more detail below. Alternatively, one or more constraints could be made known in other manners, such as pre-programmed into consumption module 102, separate notification being given of the constraints (e.g., a separate message sent to device 100, or obtaining the constraints from a web site, etc.), and so forth.

Content 112 is typically protected by being encrypted so that content 112 can only be consumed in an intelligible manner if the proper decryption key is known. Consumption module 102 employs various DRM techniques to determine when it is permissible to decrypt and consume the content (in accordance with the constraints on the use of content 112). The DRM techniques can be implemented in a variety of different manners. For example, the DRM techniques can include verification that the operating system and/or other software executing on device 100 is trustworthy, verification that the constraints dictated by the owner of the copyright of content 112 and/or the distributor of content 112 have been satisfied, and so forth. Various different DRM techniques are known to those skilled in the art, and one or more of such techniques can be used by consumption module 102.

One or more constraints on the use of particular content 112 are identified based on a leaf license and one or more corresponding root policy addenda. A leaf license for particular content 112 includes both a policy identifying when it is permissible to decrypt the particular content 112 (and/or when it is not permissible to decrypt the particular content 112) and a content key for decrypting the particular content 112. This content key is oftentimes a shared key used with symmetric key encryption, although can alternatively be a private key used with public key encryption.

The policy identifies one or more actions that can be taken with the corresponding content 112, one or more parties that can take those one or more actions, and/or one or more constraints or conditions to be satisfied in order to take those actions. Alternatively, or in addition, the policy can identify one or more actions that cannot be taken with corresponding content 112, and/or one or more parties that cannot take one or more actions. Examples of actions that the policy can identify that can be taken (or alternatively cannot be taken) include playback of the corresponding content 112, burning the corresponding content 112 to a CD or other optical disc, copying the corresponding content 112 to another device, printing a hard copy of content 112, emailing content 112, and so forth. Examples of parties that the policy can identify that can take (or alternatively cannot take) such actions include a particular device 100, a particular user of device 100, a particular operating system or program running on device 100, and so forth. Examples of constraints or conditions to be satisfied include a particular consumption module 102 running on device 100, a particular operating system running on device 100, a particular time of the day, a particular day of the week, and so forth.

Figure 2:
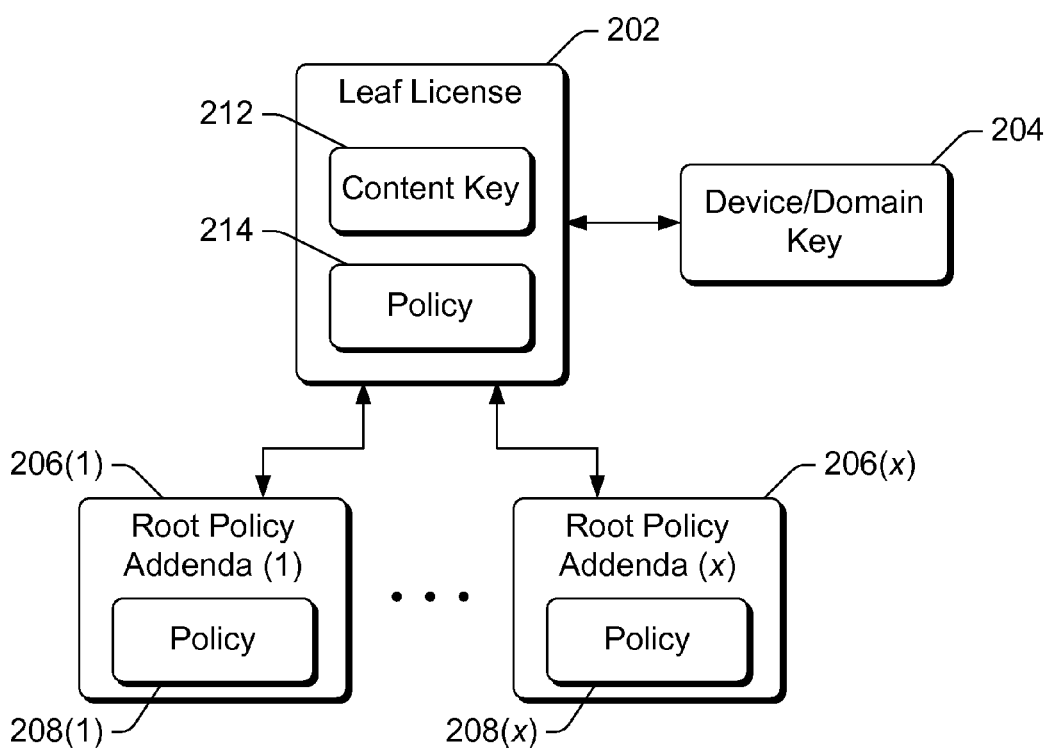
FIG. 2 illustrates an example leaf license and root policy addenda employing the separating keys and policy for consuming content in accordance with one or more embodiments.

FIG. 2 illustrates an example leaf license and root policy addenda employing the separating keys and policy for consuming content in accordance with one or more embodiments. FIG. 2 shows a leaf license 202, a device and/or domain key 204, and multiple (x) root policy addenda 206(1), ..., 206(x). Leaf license 202 is bound to device and/or domain key 204, and also corresponds to particular content (e.g., particular content 112 of FIG. 1) and one or more root policy addenda 206 correspond to leaf license 202.

Leaf license 202 can be stored in a license store of a device (e.g., store 106 of FIG. 1), another license store on another device, and/or can be embedded in the content associated with leaf license 202. Similarly, one or more of root policy addenda 206 can be stored in a license store of a device (e.g., store 106 of FIG. 1), another license store on another device, and/or can be embedded in the content associated with leaf license 202. An embedded license refers to a license that is included in the associated content rather than being a separate component from the associated content. Regardless of whether leaf license 202 is embedded in the associated content, leaf license 202 is separate from each of root policy addenda 206. For example, license 202 and each addenda 206 can be stored as separate files, as separate records within a database or file, and so forth.

Leaf license 202 corresponds to (or is associated with) particular content (e.g., particular content 112 of FIG. 1). Multiple different leaf licenses 202 can correspond to multiple different content (e.g., different content 112 of FIG. 1). This correspondence between content and leaf license 202 can be maintained in different manners. In one or more embodiments, leaf license 202 corresponds to the content in which leaf license 202 is embedded. In other embodiments, leaf license 202 includes an identifier of content to which license 202 corresponds. This correspondence can also be maintained in other manners, such as by using a naming convention that associates a name of a file including leaf license 202 with a name of a file including particular content, by including an identifier of leaf license 202 in the content to which license 202 corresponds, and so forth.

Additionally, in one or more embodiments leaf license 202 and/or root policy addenda 206 can be copied among various license stores. Such stores can include an embedded license portion of the content associated with the license, a license store included in the device accessing the associated content, a license store on another device, a license store on a removable memory device, and so forth. Licenses can be copied among these various license stores by, for example, a module implementing the DRM for the device (e.g., consumption module 122 of FIG. 1).

Leaf licenses are bound to a particular key associated with the device on which the content is being used. This key corresponding to the device can be a device key or a domain key. A device key refers to a key of the device itself. A particular device key is typically known only to a particular device, and only that particular device is able to decrypt leaf licenses that are bound to that particular device key. A domain key on the other hand refers to a key that can be used by multiple devices. Individual devices can register to become part of a domain, or alternatively a user can register to become part of a domain. A particular domain key is typically known only to a set of one or more devices, and only that set of one or more devices is able to decrypt leaf licenses that are bound to that particular domain key. For example, a user could own multiple devices and register all those devices as part of a single domain, and all those devices could decrypt leaf licenses that are bound to the domain key of that domain. By way of another example, a user could log onto a particular device using a user ID associated with a particular domain, and while the user is logged in with that user ID that particular device can decrypt leaf licenses that are bound to the domain key of that domain.

Leaf license 202 includes a content key 212 and policy 214. In one or more embodiments, leaf license 202 is bound to key 204 by encrypting content key 212 such that it can only be decrypted with key 204. Key 204 can be a private key of a public/private key pair, in which case content key 212 is encrypted using the public key corresponding to key 204. Alternatively, key 204 could be a symmetric key.

The content associated with leaf license 202 is encrypted using content key 212. A module of the device accessing the content (e.g., consumption module 102 of FIG. 1) extracts content key 212 from leaf license 202 and uses key 212 to decrypt the corresponding content only if policy 214 indicates that the module is permitted to use the content.

Leaf license 202 corresponds to one or more root policy addenda 206, and policy 214 indicates that at least one of these corresponding root policy addenda 206 is to be satisfied in order for the module to be permitted to use the content. Each root policy addenda 206 includes policy 208 that identifies one or more actions, one or more parties, and/or one or more constraints as discussed above. Policy 214 can optionally identify one or more actions, one or more parties, and/or one or more constraints as discussed above. Alternatively, policy 214 can only identify at least one of the corresponding root policy addenda 206 that is to be satisfied, and rely on the root policy addenda 206 to identify one or more actions, one or more parties, and/or one or more constraints as discussed above.

Leaf license 202 is bound to or associated with one or more root policy addenda 206. Binding root policy addenda 206 to leaf license 202 ensures that only those root policy addenda 206 intended to be associated with leaf license 202 are indeed associated with leaf license 202. A rogue or malicious root policy addenda 206 would not be bound to leaf license 202, and accordingly any policy included in such a root policy addenda would not be used in determining whether particular use of the associated content is permitted.

This binding or association between leaf license 202 and root policy addenda 206 can be maintained in a variety of different manners. In one or more embodiments, this binding or association is maintained by assigning an identifier to a particular binding. This identifier is included in both leaf license 202 and each associated root policy addenda 206, and these identifiers in license 202 and addenda 206 are signed using a private key of a trust authority. Thus, only those root policy addenda 206 that include the appropriate identifier and are digitally signed by a trust authority are associated with leaf license 202. Digital signatures can be verified by a module implementing the DRM to ensure that the identifiers have not been altered after signing.

In one or more other embodiments, this binding or association is maintained by following a particular naming convention for files including license 202 and files including associated root policy addenda 206. This naming convention can use different names for different sets of leaf license 202 and corresponding root policy addenda 206, allowing these bindings to be readily identified. The names of these files following this naming convention can be digitally signed using a private key of a trust authority to ensure that the filenames have not been altered after signing. Digital certificates can also be associated with these filenames to ensure that the filenames and files were generated by a trusted entity.

In one or more other embodiments, this binding or association is maintained by having a trust authority issue a digital certificate that identifies leaf license 202 and the root policy addenda 206 associated with license 202. As the trust authority is trusted by the module implementing the DRM, the root policy addenda 206 identified in the digital certificate can be trusted as being associated with the leaf license 202 identified in the digital certificate.

In one or more other embodiments, this binding or association is maintained by encrypting the root policy addenda 206 associated with a key of leaf license 202. This encryption can be performed in different manners, such as symmetric encryption using content key 212 or another key, public key encryption using a public key of leaf license 202, and so forth. By encrypting the root policy addenda 206 so that only leaf license 202 can decrypt the addenda 206, the addenda 206 is bound to that leaf license 202.

In one or more other embodiments, this binding or association is maintained implicitly. This implicit binding can assume that a secret (e.g., a key) is maintained and is to be known in order for root policy addenda 206 to be used. For example, root policy addenda 206 can be encrypted using a particular key known by or accessible to leaf license 202, and it is simply assumed that leaf license 202 is associated with root policy addenda 206 if leaf license 202 can decrypt root policy addenda 206. If leaf license 202 cannot decrypt root policy addenda 206, then there is no binding or association between the two. Similarly, the integrity of root policy addenda 206 can be verified by leaf license 202 simply assuming that root policy addenda 206 is encrypted using a particular key. If leaf license 202 can decrypt root policy addenda 206 with the particular key then leaf license 202 is associated with root policy addenda 206. If leaf license 202 cannot decrypt root policy addenda 206 with the particular key (regardless of whether another key could be used, or whether addenda 206 is not encrypted), then there is no binding or association between the two.

It is to be appreciated that leaf license 202 and each of root policy addenda 206 can also be digitally signed by a trust authority. These digital signatures can be verified by a module implementing the DRM to ensure that the license 202 and each addenda 206 have not been altered after signing.

It should be noted that, as illustrated in FIG. 2, leaf license 202 includes content key 212. However, no such content key is included in root policy addenda 206. Content keys are excluded from root policy addenda 206, although the policies in root policy addenda 206 can still be associated with leaf license 202 as discussed above.

Figure 3:
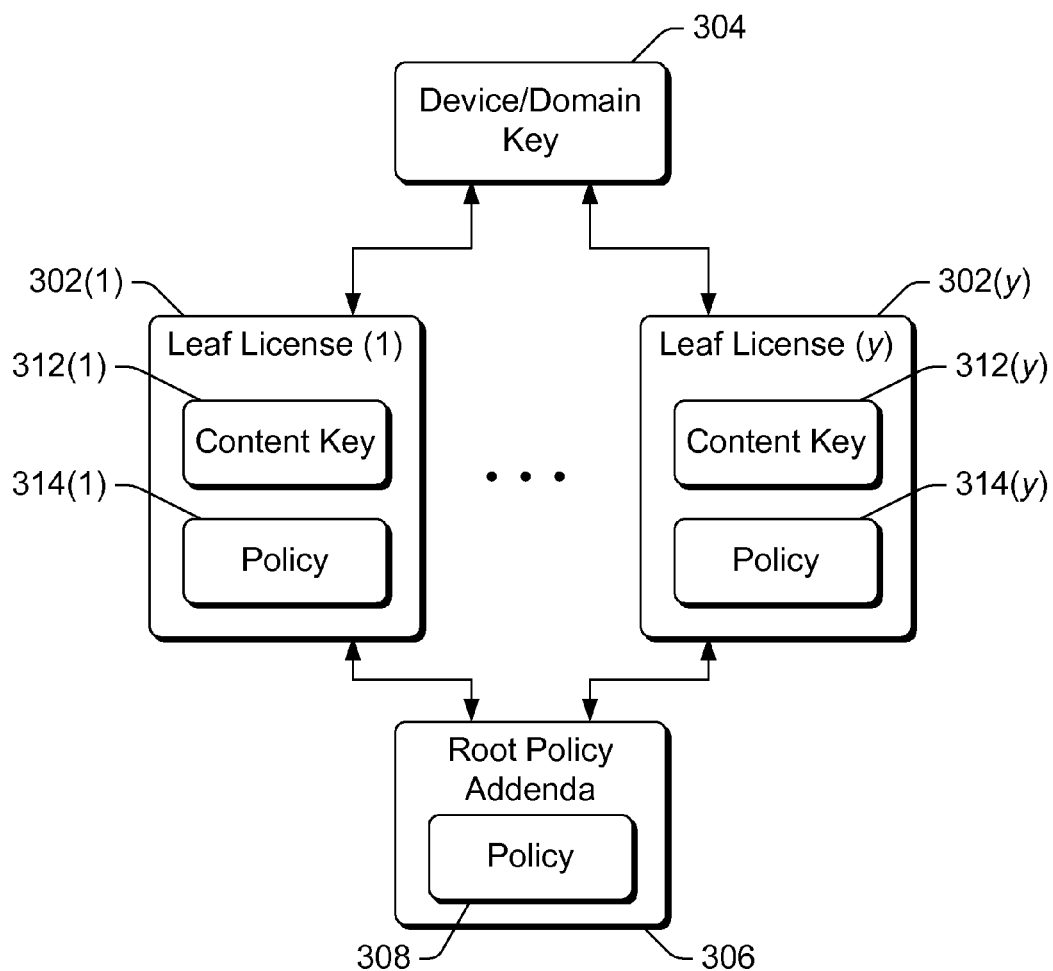
FIG. 3 illustrates example leaf licenses and root policy addenda employing the separating keys and policy for consuming content in accordance with one or more embodiments.

FIG. 3 illustrates example leaf licenses and root policy addenda employing the separating keys and policy for consuming content in accordance with one or more embodiments. FIG. 3 shows multiple leaf licenses 302(1), . . . , 302(y) (each analogous to leaf license 202 of FIG. 2), a device and/or domain key 304 (analogous to key 204 of FIG. 2), and root policy addenda 306 (analogous to a root policy addenda 206 of FIG. 2) including policy 308 (analogous to a policy 208 of FIG. 2). Each leaf license 302 includes a content key 312 (each analogous to content key 212 of FIG. 2) and policy 314 (each analogous to policy 214 of FIG. 2).

Analogous to the discussion of FIG. 2 above, each leaf license 302 is bound to device and/or domain key 304. Each leaf license 302 also corresponds to particular content. In one or more embodiments each leaf license 302 corresponds to different content, although multiple leaf licenses 302 can correspond to the same content. Additionally, each leaf license 302 is bound to the same root policy addenda 306. These bindings can occur in a variety of different manners as discussed above. FIG. 3 shows multiple leaf licenses bound to the same root policy addenda, whereas FIG. 2 shows multiple root policy addenda bound to the same leaf license.

Although not shown in FIG. 3, it is to be appreciated that one or more leaf licenses 302 can be bound to one or more additional root policy addenda 306. Such additional root policy addenda can be bound to multiple leaf licenses 302, or alternatively to a single leaf license 302. Thus, as shown in FIGS. 2 and 3, each leaf license can be bound to multiple root policy addenda, and each root policy addenda can be bound to multiple leaf licenses.

Referring to FIGS. 2 and 3, the leaf licenses and associated root policy addenda allow different policies to be easily updated on a device. This updating can be performed, for example, by update module 108 of FIG. 1, and can include adding new root policy addenda, deleting root policy addenda, and so forth. If a new policy is to added for particular content, a new root policy addenda 206 (or 306) with that new policy is stored in a license store of the device and a binding between that new root policy addenda 206 (or 306) and leaf license 202 (or 302) is established. Aside from creating this binding, no changes need be made to leaf license 202 (or 302) to accommodate this new policy.

By way of example, assume that a device downloads content as part of a subscription service in which the user of the device pays a monthly fee for the ability to playback the content. Each content (e.g., each song, movie, etc.) downloaded has an associated leaf license 202 (or 302), and each of these leaf licenses 202 (or 302) are bound to the same root policy addenda 206 (or 306). This root policy addenda 206 (or 306) can be updated every month as the monthly fee is paid. Thus, a single root policy addenda 206 (or 306) update can be performed once per month to allow access to all of the downloaded content for another month.

Furthermore, following the previous example assume that the monthly fee allows for playback of the content but not burning the content to an optical disc. Accordingly, any attempts by the user to burn the content to an optical disc will not be allowed by the DRM. If a user desires to burn particular content to an optical disc then the user can pay an additional fee for that ability. Once the fee is paid, a new root policy addenda 206 (or 306) can be downloaded by the device and bound to leaf license 202 (or 302). Once bound to leaf license 202 (or 302), subsequent attempts to burn the content to an optical disc will be successful.

Figure 4:
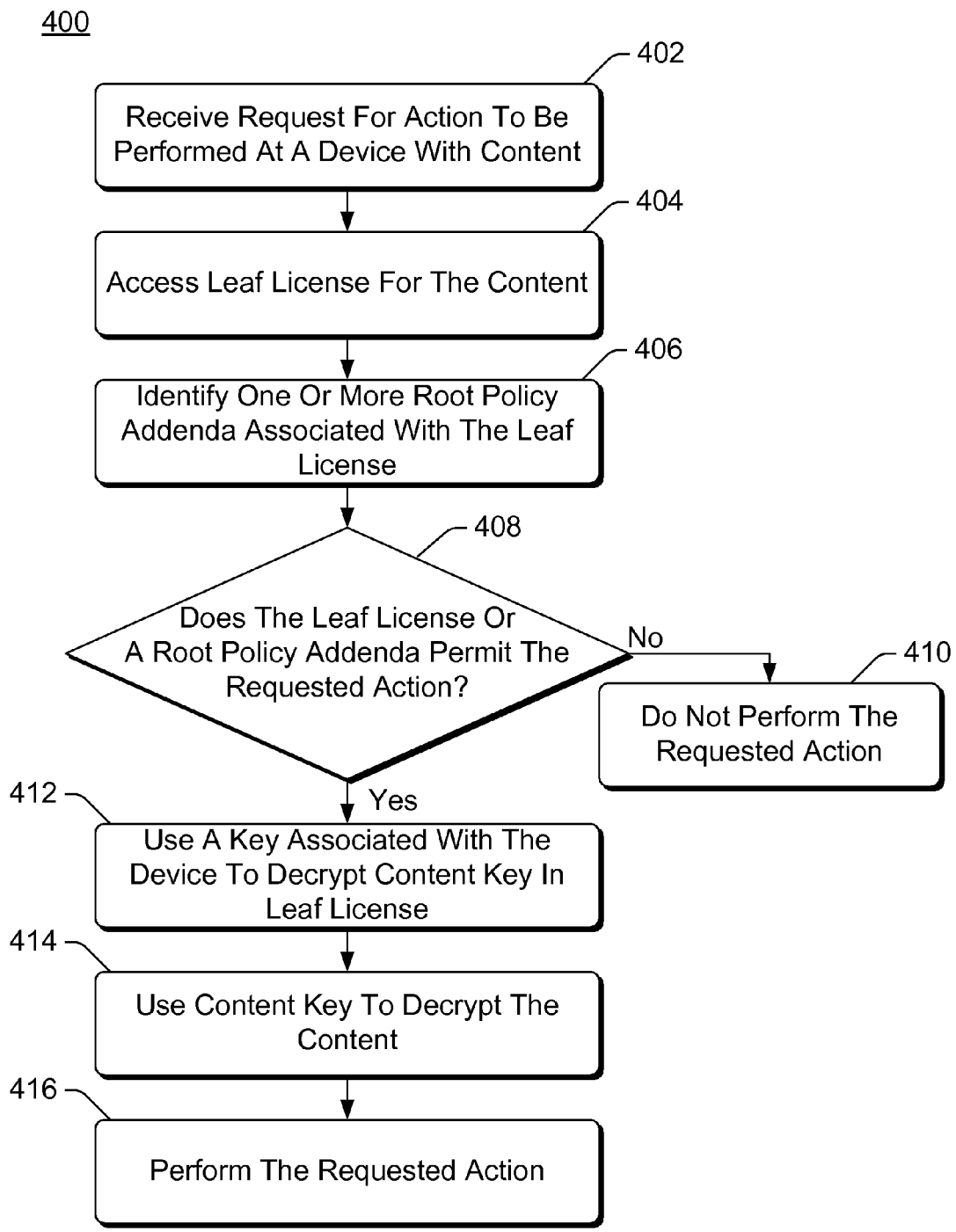
FIG. 4 is a flowchart illustrating an example process for a device consuming content using the separating keys and policy for consuming content in accordance with one or more embodiments.

FIG. 4 is a flowchart illustrating an example process 400 for a device consuming content using the separating keys and policy for consuming content in accordance with one or more embodiments. Process 400 is carried out by a device, such as device 100 of FIG. 1, and can be implemented in software, firmware, hardware, or combinations thereof. Process 400 is an example process for consuming content using the separating keys and policy for consuming content; additional discussions of consuming content using the separating keys and policy for consuming content are included herein with reference to different figures.

Initially, a request to perform an action at a device with content is received (act 402). This action is an action to consume the content in some manner, such as play, store, transfer, and/or otherwise access or use the content at the device. In response to receiving this request, a leaf license for the content is accessed (act 404) and one or more root policy addenda associated with the leaf license are identified (act 406). The root policy addenda can be associated with the leaf license in any of a variety of different manners as discussed above.

A check is then made as to whether the leaf license or one or more of the root policy addenda includes policy permitting the requested action (act 408). If no such policy permitting the requested action can be found, then the requested action is not performed (act 410).

However, if policy permitting the requested action is found in the leaf license or a root policy addenda associated with the leaf license, then a key associated with the device is used to decrypt a content key in the leaf license (act 412). This key associated with the device can be a device and/or domain key as discussed above, and is the key to which the leaf license is bound. The content key is then used to decrypt the content for which the action was requested (act 414), and the requested action is performed (act 416).

Figure 5:
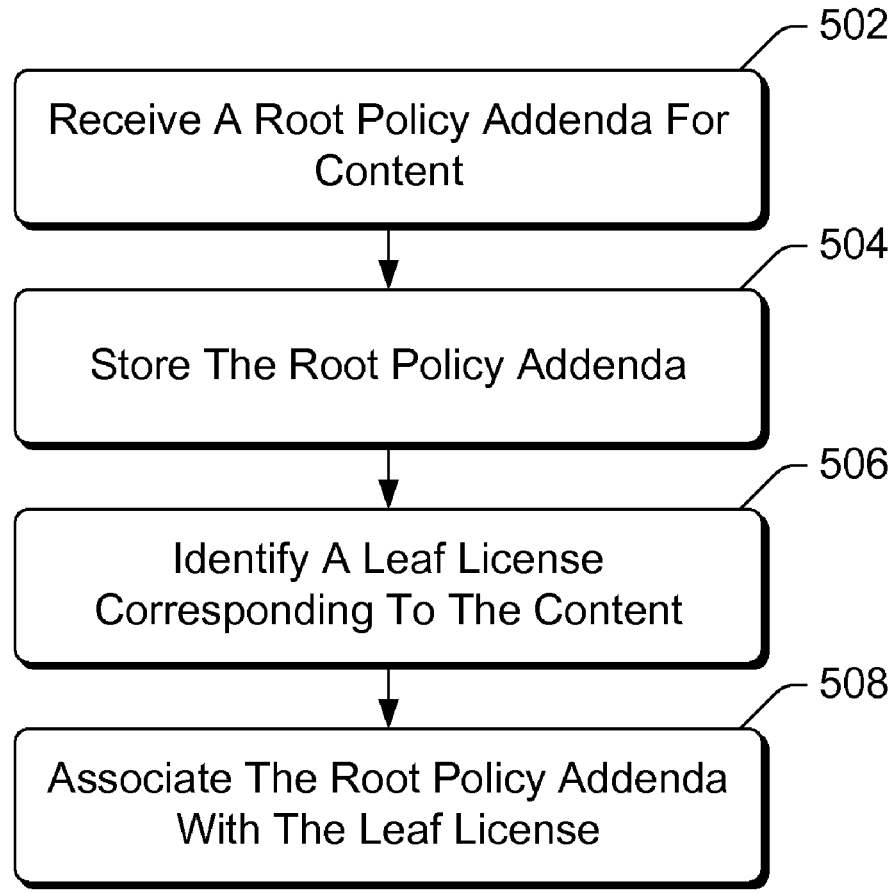
FIG. 5 is a flowchart illustrating an example process for a device updating root policy addenda using the separating keys and policy for consuming content in accordance with one or more embodiments.

FIG. 5 is a flowchart illustrating an example process 500 for a device updating root policy addenda using the separating keys and policy for consuming content in accordance with one or more embodiments. Process 500 is carried out by a device, such as device 100 of FIG. 1, and can be implemented in software, firmware, hardware, or combinations thereof. Process 500 is an example process for updating root policy addenda using the separating keys and policy for consuming content; additional discussions of updating root policy addenda using the separating keys and policy for consuming content are included herein with reference to different figures.

Initially, a root policy addenda for content is received (act 502). The root policy addenda received in act 502 is stored (act 504), and a leaf license corresponding to the content is identified (act 506). The leaf license corresponding to particular content can be identified in a variety of different manners as discussed above. The root policy addenda received in act 502 is associated with the identified leaf license (act 508). This association or binding of the root policy addenda to the leaf license can be performed in a variety of different manners as discussed above. In one or more embodiments the root policy addenda may already be associated with the leaf license (e.g., an identifier included in the leaf license is already included in the root policy addenda), in which case the associating in act 508 is performed before receipt of the root policy addenda.

Thus, as can be seen from the discussions herein, the content keys used to decrypt content are bound to a device and/or domain key. If the device and/or domain key is compromised (e.g., a rogue or malicious application or user is able to access the device and/or domain key), then a new device and/or domain key can be issued and the content keys re-bound to this new device and/or domain key. The content is thus protected because the compromised device and/or domain key can no longer be used to decrypt the content keys.

Figure 6:
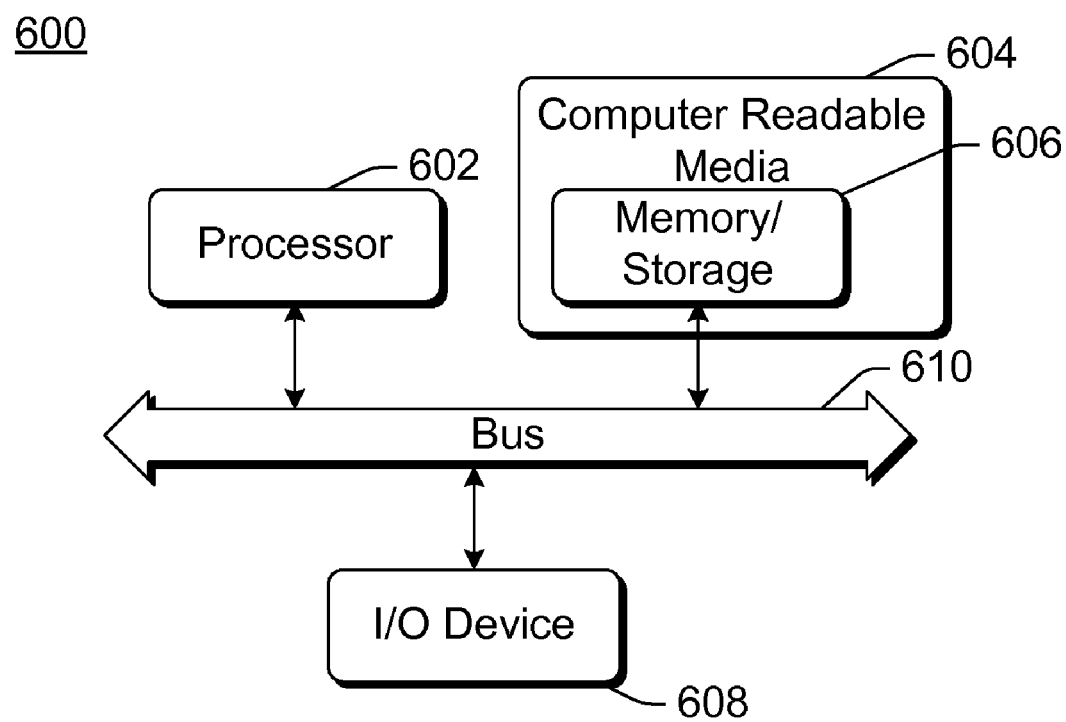
FIG. 6 illustrates an example computing device that can be configured to implement the separating keys and policy for consuming content in accordance with one or more embodiments.

FIG. 6 illustrates an example computing device 600 that can be configured to implement the separating keys and policy for consuming content in accordance with one or more embodiments. Computing device 600 can be, for example, device 100 of FIG. 1.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or I/O device(s) 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module," "functionality," and "logic" as used herein generally represent software, firmware, hardware, or combinations thereof. In the case of a software implementation, the module, functionality, or logic represents program code that performs specified tasks when executed on a processor (e.g., CPU or CPUs). The program code can be stored in one or more computer readable memory devices, further description of which may be found with reference to FIG. 6. The features of the embedded licenses for content techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media devices having stored thereon multiple instructions that, when executed by one or more processors of a computing device, cause the one or more processors to:
   receive a request to perform an action at the computing device with content;
   identify one or more root policy addenda associated with a leaf license corresponding to the content, at least one of the one or more root policy addenda being associated with multiple leaf licenses that each correspond to a particular one of multiple different content;
   if the one or more root policy addenda permit the action, then:
      use a key associated with the computing device to decrypt a content key included in the leaf license, the leaf license being separate from the one or more root policy addenda, the content key to decrypt the content being excluded from the root policy addenda;
      use the content key to decrypt the content; and
      perform the action with the content; and
   if the one or more root policy addenda do not permit the action then do not perform the action.

2. One or more computer storage media devices as recited in claim 1, wherein to identify the one or more root policy addenda is to access the leaf license and identify the one or more root policy addenda bound to the leaf license.

3. One or more computer storage media devices as recited in claim 2, wherein to identify the one or more root policy addenda bound to the leaf license is to obtain an identifier from the leaf license and identify the one or more root policy addenda that include the identifier.

4. One or more computer storage media devices as recited in claim 1, wherein the key associated with the computing device is a domain key for a domain of which the computing device is a part.

5. One or more computer storage media devices as recited in claim 1, wherein each of the one or more root policy addenda includes policy identifying when it is permissible to decrypt and consume the content.

6. One or more computer storage media devices as recited in claim 1, wherein the leaf license is embedded in the content.

7. One or more computer storage media devices as recited in claim 1, wherein the action comprises playback of the content at the computing device.

8. A method implemented on a device, the method comprising:
   receiving a root policy addenda corresponding to a request to perform an action with content on the device, the root policy addenda including policy identifying when it is permissible to decrypt and consume the content but excluding a content key to decrypt the content, the root policy addenda being associated with a leaf license for the content, the leaf license being separate from the root policy addenda and including the content key to decrypt the content;
   storing the root policy addenda in a root policy addenda store;
   associating the root policy addenda with one or more additional leaf licenses that each correspond to a particular one of different content on the device;
   if the one or more root policy addenda permit the action, then:
   utilizing a device key that is associated with the device to decrypt the content key included in the leaf license;
   utilizing the content key to decrypt the content on the device if the root policy addenda permits a requested action with the content on the device; and
   performing the requested action with the content when decrypted;
   if the one or more root policy addenda do not permit the action then do not perform the action.

9. A method as recited in claim 8, further comprising:
   identifying the leaf license corresponding to the content; and
   associating the root policy addenda with the leaf license.

10. A method as recited in claim 8, wherein the content key is encrypted with a domain key for a domain of which the device is a part.

11. A method as recited in claim 8, wherein the leaf license is embedded in the content.

12. A device comprising:
   a first store implemented in memory storage to store, in response to a request, content for use on the device;
   a second store implemented in the memory storage to store a leaf license for the content in the first store and one or more root policy addenda bound to the leaf license, at least one of the one or more root policy addenda being bound to multiple additional leaf licenses that each correspond to a particular one of multiple different content, each root policy addenda including policy identifying when it is permissible to decrypt and consume the content but excluding a content key to decrypt the content, the content key being included in the leaf license; and
   a consumption module, coupled to the first store and the second store, the consumption module to consume the content only if the policy identifies that it is permissible to decrypt and consume the content, the consumption module further to use a device key associated with the device to decrypt the content key included in the leaf license, and use the content key to decrypt the content to consume the content.

13. A device as recited in claim 12, further comprising an update module to:

receive a new root policy addenda corresponding to the content, the new root policy addenda including policy identifying when it is permissible to decrypt and consume the content but excluding the content key to decrypt the content;

store the root policy addenda in the second store;

identify the leaf license; and associate the new root policy addenda with the leaf license.

14. A device as recited in claim 12, wherein the one or more root policy addenda are bound to the leaf license by being encrypted using a key of the leaf license.

15. A device as recited in claim 12, wherein to consume the content is to playback audio/video content.

16. A device as recited in claim 12, wherein the leaf license includes a policy identifying the one or more root policy addenda.

* * * * *